United States Patent
Tsuzuki et al.

(10) Patent No.: US 10,332,694 B2
(45) Date of Patent: Jun. 25, 2019

(54) ELECTRIC DOUBLE-LAYER CAPACITOR

(71) Applicant: TAIYO YUDEN CO., LTD., Taito-ku, Tokyo (JP)

(72) Inventors: Takeo Tsuzuki, Takasaki (JP); Takatoshi Nagase, Takasaki (JP)

(73) Assignee: TAIYO YUDEN CO, LTD., Tokyo (JP)

( * ) Notice: Subject to any disclaimer, the term of this patent is extended or adjusted under 35 U.S.C. 154(b) by 97 days.

(21) Appl. No.: 15/181,305

(22) Filed: Jun. 13, 2016

(65) Prior Publication Data
US 2017/0011862 A1    Jan. 12, 2017

(30) Foreign Application Priority Data

Jul. 6, 2015 (JP) .................... 2015-135316

(51) Int. Cl.
*H01G 11/60* (2013.01)
*H01G 11/62* (2013.01)

(52) U.S. Cl.
CPC ............. *H01G 11/62* (2013.01); *H01G 11/60* (2013.01); *Y02E 60/13* (2013.01)

(58) Field of Classification Search
CPC ..................................... Y02E 60/13
See application file for complete search history.

(56) References Cited

U.S. PATENT DOCUMENTS

| 2010/0018469 | A1* | 1/2010 | Gottschling | A01K 11/002 |
| | | | | 119/174 |
| 2010/0118469 | A1 | 5/2010 | Shima et al. | |

FOREIGN PATENT DOCUMENTS

| JP | 2008117939 A | 5/2008 |
| JP | 2008243832 A | 10/2008 |
| JP | 2009218472 A | 9/2009 |
| KR | 1020120000720 A | 1/2012 |
| WO | 2008123529 A1 | 10/2008 |

OTHER PUBLICATIONS

A Notification of Reason for Refusal issued by Korean Intellectual Property Office, dated Apr. 20, 2017, for Korean counterpart application No. 1020160046949.

* cited by examiner

*Primary Examiner* — C Melissa Koslow
(74) *Attorney, Agent, or Firm* — Law Office of Katsuhiro Arai

(57) ABSTRACT

An electric double-layer capacitor contains an electrolytic solution, wherein the electrolytic solution comprises 1.2 to 1.8 mol/L of spirobipyrrolidinium tetrafluoroborate as electrolyte as well as solvent, where the solvent contains 50 to 60 percent by volume of propylene carbonate, 30 to 36 percent by volume of dimethyl carbonate, and 4 to 20 percent by volume of ethyl methyl carbonate. The electric double-layer capacitor can maintain its initial high capacitance and low internal resistance, while undergoing smaller characteristic changes after being exposed to low-temperature environments, high-voltage environments or high-temperature environments.

4 Claims, 1 Drawing Sheet

ELECTRIC DOUBLE-LAYER CAPACITOR

BACKGROUND

Field of the Invention

The present invention relates to an electric double-layer capacitor.

Description of the Related Art

Electric double-layer capacitors using non-aqueous electrolytic solution are able to store a large amount of energy because the high electrolytic voltage of their solvent allows for high withstand voltage. In recent years, electric double-layer capacitors are seeing their applications expand, while facing strict, demand for devices. To be specific, they are required to ensure a level of reliability backed by operating voltages higher than 2.5 V (such as 2.7 V) and also by small characteristic changes at low temperatures (e.g., −40° C.) and at high temperatures (e.g., 85° C.).

When it comes to improving the low-temperature characteristics (reducing the internal resistance), for example, Patent Literature 1 proposes an electrolytic solution whose solute is spirobipyrrolidinium salt and whose solvent comprises propylene carbonate, ethylene carbonate, and dimethyl carbonate mixed together at certain ratios, for the purpose of reducing the internal resistances of electric double-layer capacitors. Also, Patent Literature 2 proposes an electrolytic solution for electric double-layer capacitors offering excellent low-temperature characteristics, whose solute comprises a mixture of quaternary ammonium tetrafluoroborate and quaternary ammonium hexafluorophosphate, and whose solvent comprises ethylene carbonate, ethyl methyl carbonate, and dimethyl carbonate mixed together at certain ratios. Furthermore, Patent Literature 3 proposes an electrolytic solution for electric double-layer capacitors characterized by low viscosity and high electrical conductivity even at low temperatures of −30 to −40° C., whose solute is a pyrrolidinium ionic liquid and whose solvent comprises ethylene carbonate, ethyl methyl carbonate, and dimethyl carbonate mixed together at certain ratios. Patent Literature 4 proposes an electrolytic solution for electrochemical elements whose solute is imidazolium salt, wherein the electrolytic solution does not deposit, solidify, etc., even at extremely low temperatures.

BACKGROUND ART LITERATURES

[Patent Literature 1] Japanese Patent Laid-open No. 2008-117939

[Patent Literature 2] Japanese Patent Laid-open No. 2008-243832

[Patent Literature 3] International Patent Laid-open No. WO2008/123529

[Patent Literature 4] Japanese Patent Laid-open No. 2009-218472

SUMMARY

Various studies have been done to date with the aim of reducing the internal resistances of electric double-layer capacitors or improving their low-temperature characteristics. However, the present reality is that, even if their internal resistances are reduced or low-temperature characteristics are improved successfully, electric double-layer capacitors do not yet achieve satisfactory performance when it comes to use at high voltages (such as 2.7 V) or stability at high temperatures (such as 85° C.). For example, use of ethylene carbonate as the solvent of electrolytic solution promotes the dissociation of electrolytic solution due to the high dielectric constant of the solvent, which in turn improves the internal resistances and low-temperature characteristics of electric double-layer capacitors. If these electric double-layer capacitors are used at high temperatures, however, the solvent starts to break down markedly just after reaching 2.5 V and this causes the capacitor characteristics to deteriorate. On the other hand, use of imidazolium salt as the electrolyte makes the electrolyte more resistant to depositing at low temperatures compared to when quaternary ammonium salt is used, and the low-temperature characteristics of the capacitor improve as a result. However, the withstand voltage of imidazolium salt is not very high and therefore the electrolyte starts to break down markedly just after reaching 2.5 V and causes the capacitor characteristics to deteriorate. In the meantime, use of quaternary ammonium hexafluorophosphate as the electrolyte improves the low-temperature characteristics of the capacitor because the dissociation property of the electrolyte becomes higher than when quaternary ammonium tetrafluoroborate is used. However, the low heat resistance and water resistance of hexafluorophosphate salt cause it to react with a trace amount of water present inside the cell at high temperature and break down, thereby causing the capacitor characteristics to deteriorate.

On the other hand, examples have been reported where propylene carbonate characterized by higher withstand voltage than ethylene carbonate is used. However, propylene carbonate has lower dielectric constant and higher viscosity than ethylene carbonate, meaning that the internal resistances of electric double-layer capacitors using propylene carbonate generally exhibit higher internal resistances than those using ethylene carbonate.

In light of the above, an object of the present invention is to provide an electric double-layer capacitor maintaining its initial high capacitance and low internal resistance, while undergoing smaller characteristic changes after being exposed to low-temperature environments, high-voltage environments or high-temperature environments.

Any discussion of problems and solutions involved in the related art has been included in this disclosure solely for the purposes of providing a context for the present invention, and should not be taken as an admission that any or all of the discussion were known at the time the invention was made.

After studying in earnest, the inventors of the present invention completed the present invention described below.

The electric double-layer capacitor proposed by the present invention contains an electrolytic solution. The electrolytic solution is constituted by an electrolyte and solvent. The electrolyte is spirobipyrrolidinium tetrafluoroborate of 1.2 to 1.8 mol/L. The solvent contains 50 to 60 percent by volume of propylene carbonate, 30 to 36 percent by volume of dimethyl carbonate, and 4 to 20 percent by volume of ethyl methyl carbonate.

In some embodiments, the electrolytic solution comprises, consists essentially of, or consists of the aforementioned spirobipyrrolidinium tetrafluoroborate, propylene carbonate, dimethyl carbonate, and ethyl methyl carbonate. Preferably the aforementioned spirobipyrrolidinium tetrafluoroborate, propylene carbonate, dimethyl carbonate, and ethyl methyl carbonate account for 95 percent or more of the total weight of the electrolytic solution.

According to the present invention, an electric double-layer capacitor is provided whose initial high capacitance and low internal resistance are not inferior to those achieved by any prior art, and whose characteristic changes after being exposed to low-temperature environments, high-voltage environments or high-temperature environments are small.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

Figure 1A:
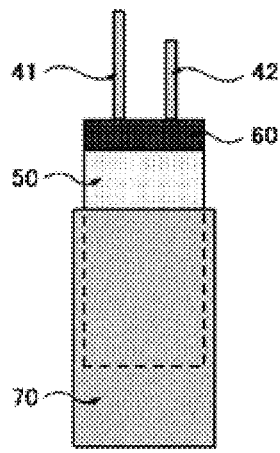
FIG. 1A, FIG. 1B, and FIG. 1C are schematic views of an electric double-layer capacitor representing an embodiment of the present invention.

10—Positive electrode, 11—Positive electrode collector, 12—Positive electrode layer, 20—Negative electrode, 21—Negative electrode collector, 22—Negative electrode layer, 30—Separator, 41—Positive electrode terminal, 42—Negative electrode terminal, 50—Element, 60—Sealing rubber, 70—Outer can.

DETAILED DESCRIPTION OF EMBODIMENTS

The present invention is described in detail below by referring to the drawing as deemed appropriate. It should be noted, however, that the present invention is not limited to the embodiment illustrated herein, and that characteristic portions of the invention may be emphasized in the drawing and therefore the accuracy of scale in each part of the drawing is not necessarily guaranteed.

Figure 1B:
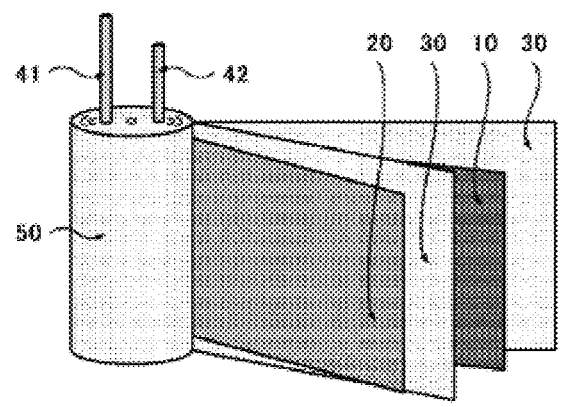
Figure 1C:
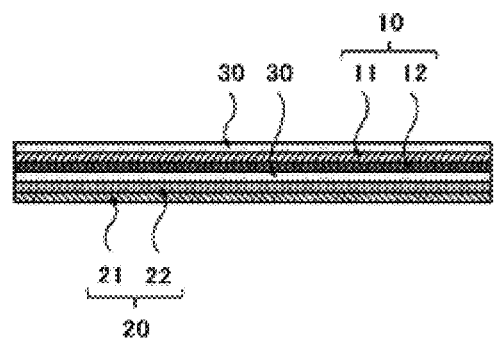

FIG. 1A, FIG. 1B, and FIG. 1C provide schematic views of an electric double-layer capacitor as an example of electrochemical capacitor. FIG. 1A is a perspective plan view, FIG. 1B is an exploded view, and FIG. 1C is a section view. The electric double-layer capacitor has, for example, an electric storage element 50 having a positive electrode 10, negative electrode 20 and separator 30 between the positive electrode 10 and negative electrode 20, as well as an outer can 70 housing the electric storage element 50. Here, a pair of terminals 41, 42 are connected to the positive electrode 10 and negative electrode 20, respectively. The terminals 41, 42 extend to connect to the outside through a sealing rubber 60. An electrolytic solution (described below) is sealed inside the can 70 and impregnated in active materials 12, 22 of the positive electrode 10 and negative electrode 20 or in the separator 30. The electric double-layer capacitor remains sealed as its sealing rubber 60 is clinched by the outer can 70.

FIG. 1C illustrates a structure where a positive electrode layer 12 and negative electrode layer 22 are placed on one side of a positive electrode collector 11 and negative electrode collector 21, respectively. Under the present invention, electrode structures, etc., are not limited in any way and electrode layers may be placed on both sides of a power collector, for example. Also, the electric double-layer capacitor need not be of the cylindrical type as illustrated, but it may be of laminate type, coin type, or any other type. The shape of the element 50 is not limited, either, in any way, and the element 50 can have the winding structure as illustrated or a laminate structure, while the outer can 70 may be a square can.

It suffices that the separator 30 is constituted to prevent the multiple electrodes (typically positive electrode and negative electrode) from contacting each other physically, and the form in which such contact is prevented is not limited in any way. In addition, the separator 30 is preferably porous and, by causing the electrolytic solution to be retained in its voids, conductive paths between the electrodes are formed in a favorable manner. The material of the separator 30 is not limited in any way, and examples include, but are not limited to, porous cellulose, polypropylene, polyethylene, fluororesin, etc.

With the electric double-layer capacitor of the mode shown in FIG. 1A, FIG. 1B, and FIG. 1C, the positive electrode layer 12 and negative electrode layer 22 are formed, as necessary, via a conductive adhesive or conductive coating layer (not illustrated), respectively, on the surface of the positive electrode collector 11 and negative electrode collector 21 made of metal foil.

For the metal foil used to form the power collectors, any conductive metal in sheet form can be used without limitation, but the material is preferably aluminum or copper. The size, thickness and other dimensions of the metal foil are not limited in any way, and dimensions based on any prior art of electrochemical capacitors may be used accordingly as deemed appropriate.

For the electrode layers 12, 22, electrode layers having any known structure used for the polarizable electrode layers of electric double-layer capacitors can be used. The electrode layers 12, 22 normally contain, for example, an active material selected from polyaniline (PAN), polyacene semiconductor substance (PAS), active carbon, carbon black, graphite, carbon nano-tubes, etc. The electrode layers 12, 22 may also contain, as necessary, conducting agent, binder, or other components used in the polarizable electrode layers of electric double-layer capacitors.

The composition of electrolytic solution is characteristic of the present invention.

Preferably the electrolytic solution of the electric double-layer capacitor is a non-aqueous electrolytic solution constituted by organic solvent and solute.

Under the present invention, spirobipyrrolidinium tetrafluoroborate is used as the electrolyte.

From the viewpoint of demonstrating the effects of the present invention, the concentration of the spirobipyrrolidinium tetrafluoroborate constituting the electrolyte is 1.2 to 1.8 mol/L.

The electrolytic solution contains all of propylene carbonate, dimethyl carbonate, and ethyl methyl carbonate as its solvent. When the total content (volume base) of solvent represents 100 percent by volume, the contents of the aforementioned substances fall within the following ranges: 50 to 60 percent by volume for the content of propylene carbonate, 30 to 36 percent by volume for the content of dimethyl carbonate, and 4 to 20 percent by volume for the content of ethyl methyl carbonate. Use of this mixed solvent is necessary in order to demonstrate the effects of the present invention described above.

Under the present invention, more preferably the electrolytic solution is constituted by only the four substances mentioned above, or specifically spirobipyrrolidinium tetrafluoroborate as the electrolyte and propylene carbonate, dimethyl carbonate, and ethyl methyl carbonate as the solvent. Substances other than the aforementioned four may be contained, but preferably the aforementioned four substances account for 95 percent by weight or more of the electrolytic solution. Substances that may be contained in the electrolytic solution other than the aforementioned four substances include, but are not limited to, chained carbonates and cyclic carbonates other than the above, esters, lactones, sulfones, sulfonate esters, nitriles, ethers, etc.

The present invention is not limited in any way except for the constitution of electrolytic solution, and any prior art can be referenced as deemed appropriate for the shape and manufacturing method of the electric double-layer capacitor, and the like. The constitutions of the examples given below can also be referenced.

EXAMPLES

The present invention is explained in greater detail below using examples. It should be noted, however, that the present invention is not limited in any way to the embodiments of the examples.

[Manufacturing Method]

A slurry containing polyacene semiconductor material (PAS) being an electrode active material, as well as carboxy methyl cellulose and styrene butadiene rubber as binder, was prepared and this slurry was coated onto aluminum foils to obtain polarizable electrodes. A separator made of cellulose material was placed between the polarizable electrodes thus obtained, after which leader terminals were attached by supersonic welding and then all of the materials were wound together and the resulting element was secured with polyimide adhesive tape. A sealing rubber was attached to the produced element, which was then vacuum-dried at approx. 180° C. The obtained element was put in an outer can and then an electrolytic solution (described later) was filled. Thereafter, the sealing rubber was clinched to obtain an electric double-layer capacitor cell.

[Evaluation Methods]

Each electric double-layer capacitor thus obtained was measured for initial characteristics including capacitance and internal resistance. The capacitance was calculated from the slope of the discharge curve obtained by discharging the electric double-layer capacitor for 30 minutes at room temperature and charging it for 10 minutes to 2.5 V at 100 mA, and then discharging it again to 0 V at 10 mA, using a charge/discharge tester (TOSCAT-3200 manufactured by Toyo System Co., Ltd.). The internal resistance was calculated from the voltage drop that occurred when the electric double-layer capacitor was discharged for 30 minutes at room temperature, charged for 10 minutes to 2.5 V at 100 mA, and then discharged again to 0 V at 2 A, using a charge/discharge tester (TOSCAT-3200 manufactured by Toyo System Co., Ltd.).

Thereafter, the capacitor was let stand for 2 hours in a thermostatic chamber controlled at −40° C., and then measured for capacitance and internal resistance.

Separately, a float test that involved charging the capacitor continuously for 1000 hours at a voltage of 2.7 V in a thermostatic chamber controlled at 70° C., and a float test that involved charging the capacitor continuously for 1000 hours at a voltage of 2.3 V in a thermostatic chamber controlled at 85° C., were conducted. After the float tests, the cell was let cool to room temperature, and then measured for capacitance and internal resistance.

The aforementioned capacitance and internal resistance measured after the capacitor was let stand at −40° C. and completed the two types of float tests, were each calculated as a relative percent value with reference to the measured value of initial characteristic (100%).

The constitution of electrolytic solution for the electric double-layer capacitor in each manufacturing example is shown in Table 1 below.

Those with an asterisk (*) added before the manufacturing number correspond to examples of the present invention.

The solvents and electrolytes are abbreviated as follows:
PC—Propylene carbonate
DMC—Dimethyl carbonate
EMC—Ethyl methyl carbonate
EC—Ethylene carbonate
SBPBF$_4$—Spirobipyrrolidinium tetrafluoroborate
TEMABF$_4$—Triethyl methyl ammonium tetrafluoroborate
EMIMBF$_4$—1-ethyl-3-methyl imidazolium tetrafluoroborate
TEMAPF$_6$—Tetraethyl ammonium hexafluorophosphate

TABLE 1

| Manufacturing No. | Solvent | [Vol %] | Electrolyte [Concentration, mol/L] |
|---|---|---|---|
| 1 | PC/DMC/EMC | [50/50/0] | SBPBF$_4$ [1.5] |
| 2 | PC/DMC/EMC | [50/45/5] | SBPBF$_4$ [1.5] |
| 3 | PC/DMC/EMC | [50/40/10] | SBPBF$_4$ [1.5] |
| *4 | PC/DMC/EMC | [50/35/15] | SBPBF$_4$ [1.5] |
| *5 | PC/DMC/EMC | [50/30/20] | SBPBF$_4$ [1.5] |
| 6 | PC/DMC/EMC | [50/25/25] | SBPBF$_4$ [1.5] |
| 7 | PC/DMC/EMC | [50/20/30] | SBPBF$_4$ [1.5] |
| 8 | PC/DMC/EMC | [60/40/0] | SBPBF$_4$ [1.5] |
| *9 | PC/DMC/EMC | [60/36/4] | SBPBF$_4$ [1.5] |
| *10 | PC/DMC/EMC | [60/32/8] | SBPBF$_4$ [1.5] |
| 11 | PC/DMC/EMC | [60/28/12] | SBPBF$_4$ [1.5] |
| 12 | PC/DMC/EMC | [60/24/16] | SBPBF$_4$ [1.5] |
| 13 | PC/DMC/EMC | [50/35/15] | SBPBF$_4$ [1.0] |
| *14 | PC/DMC/EMC | [50/35/15] | SBPBF$_4$ [1.2] |
| *15 | PC/DMC/EMC | [50/35/15] | SBPBF$_4$ [1.8] |
| 16 | PC/DMC/EMC | [50/35/15] | SBPBF$_4$ [2.0] |
| 17 | PC/DMC | [70/30/0] | SBPBF$_4$ [1.5] |
| 18 | PC/DMC/EMC | [50/35/15] | TEMABF$_4$ [1.5] |
| 19 | PC/DMC/EMC | [60/36/4] | TEMABF$_4$ [1.5] |
| 20 | PC/DMC/EMC | [50/35/15] | EMIMBF$_4$ [1.0] |
| 21 | PC/EC/DMC | [27/29/44] | SBPBF$_4$ [1.5] |
| 22 | EC/DMC/EMC | [27/40/33] | SBPBF$_4$ [1.1] |
| 23 | EC/DMC/EMC | [44/23/33] | TEMABF$_4$ [1.2] + TEMAPF$_6$ [0.2] |

In Manufacturing Example 23, TEMABF$_4$ and TEMAPF$_6$ were mixed as electrolyte.

An excerpt of the evaluation results of the electric double-layer capacitors in the manufacturing examples is shown in Table 2 below.

Those with an asterisk (*) added before the manufacturing number correspond to examples of the present invention.

"Initial capacitance" and "Initial internal resistance" are measured values of initial characteristics. "Relative capacitance 1" and "Relative internal resistance 1" are relative values (%) of the respective characteristic values measured after the capacitor was let stand at −40° C., with reference to the aforementioned measured values of initial characteristics (100%).

TABLE 2

| Manufacturing No. | Initial capacitance [F] | Initial internal resistance [mΩ] | Relative capacitance 1 [%] | Relative internal resistance 1 [%] |
|---|---|---|---|---|
| 1 | 4.3 | 85 | 75 | 814 |
| 2 | 4.3 | 85 | 76 | 802 |
| 3 | 4.3 | 86 | 78 | 788 |
| *4 | 4.3 | 87 | 95 | 452 |
| *5 | 4.3 | 87 | 95 | 493 |
| 6 | 4.3 | 87 | 94 | 538 |
| 7 | 4.3 | 88 | 94 | 584 |
| 8 | 4.3 | 95 | 76 | 820 |
| *9 | 4.3 | 96 | 95 | 472 |
| *10 | 4.3 | 96 | 95 | 494 |
| 11 | 4.3 | 97 | 95 | 519 |
| 12 | 4.3 | 97 | 94 | 544 |
| 13 | 4.2 | 102 | 94 | 375 |
| *14 | 4.3 | 91 | 95 | 406 |
| *15 | 4.3 | 96 | 96 | 499 |
| 16 | 4.3 | 108 | 97 | 530 |
| 17 | 4.3 | 110 | 87 | 546 |
| 18 | 4.2 | 91 | 75 | 976 |
| 19 | 4.2 | 100 | 82 | 672 |
| 20 | 4.3 | 87 | 94 | 458 |
| 21 | 4.3 | 100 | 95 | 512 |
| 22 | 4.3 | 92 | 94 | 498 |
| 23 | 4.2 | 96 | 82 | 736 |

TABLE 3

| Manufacturing No. | Relative capacitance 2 [F] | Relative internal resistance 2 [mΩ] | Relative capacitance 3 [%] | Relative internal resistance 3 [%] |
|---|---|---|---|---|
| 1 | 78 | 165 | 77 | 145 |
| 2 | 78 | 163 | 77 | 143 |
| 3 | 78 | 160 | 77 | 143 |
| *4 | 78 | 158 | 77 | 142 |
| *5 | 78 | 156 | 77 | 142 |
| 6 | 78 | 153 | 77 | 140 |
| 7 | 78 | 151 | 77 | 138 |
| 8 | 78 | 159 | 77 | 143 |
| *9 | 78 | 156 | 77 | 140 |
| *10 | 78 | 155 | 77 | 140 |
| 11 | 78 | 153 | 77 | 138 |
| 12 | 78 | 150 | 77 | 136 |
| 13 | 78 | 226 | 77 | 172 |
| *14 | 78 | 183 | 77 | 149 |
| *15 | 78 | 148 | 77 | 139 |
| 16 | 79 | 142 | 78 | 137 |
| 17 | 78 | 157 | 77 | 140 |
| 18 | 77 | 160 | 77 | 143 |
| 19 | 77 | 158 | 77 | 142 |
| 20 | 62 | 266 | 68 | 186 |
| 21 | 73 | 247 | 74 | 194 |
| 22 | 71 | 272 | 74 | 202 |
| 23 | 65 | 255 | 58 | 276 |

The above results are considered. In Manufacturing Examples 1 to 3 and 8, the relative capacitance became lower and relative internal resistance became higher after the capacitor was let stand at −40° C., probably because the electrolytic solution froze at −40° C. Also, there is a tendency that the higher the percentage of EMC in the solvent, the higher the relative internal resistance became. This is probably due to the increase in the percentage of EMC whose polarity is lower than that of DMC at low temperature, which inhibited the dissociation of solute. In Manufacturing Examples 13 to 16, the relative internal resistance at low temperature increased when the concentration of electrolytic solution was higher, probably because the higher the concentration of electrolytic solution, the higher the viscosity of electrolytic solution became at low temperature. In Manufacturing Examples 18, 19 and 23, the relative capacitance was low while the relative internal resistance was high, probably because the solute deposited at −40° C. Preferably the relative internal resistance at −40° C. is less than 500% (of the value at 20° C.).

Additional evaluation results of the electric double-layer capacitors in the manufacturing examples are shown in Table 3 below.

Those with an asterisk (*) added before the manufacturing number correspond to examples of the present invention.

"Relative capacitance 2" and "Relative internal resistance 2" are relative values (%) of the respective characteristic values measured after the float test involving 1000 hours of continuous charging at a voltage of 2.7 V in a thermostatic chamber controlled at 70° C., with reference to the aforementioned measured values of initial characteristics (100%).

"Relative capacitance 3" and "Relative internal resistance 3" are relative values (%) of the respective characteristic values measured after the float test involving 1000 hours of continuous charging at a voltage of 2.3 V in a thermostatic chamber controlled at 85° C., with reference to the aforementioned measured values of initial characteristics (100%).

The above results are considered. In Manufacturing Examples 20 to 23, the relative internal resistance was higher after the float test at 2.7 V/70° C., probably because the imidazolium salt and EC broke down electrically. In Manufacturing Example 23, the characteristics worsened markedly after the float test at 2.3 V/85° C., probably because the hexafluorophosphate constituting the solute broke down due to heat. Preferably the relative internal resistance after the float test at 2.7 V/70° C. (Relative internal resistance 2 above) is less than 200%, while the relative internal resistance after the float test at 2.3 V/85° C. (Relative internal resistance 3) is less than 150%.

In Manufacturing Examples 13 and 22, the relative internal resistance after the capacitor was let stand at low temperature (Relative internal resistance 1) was good but the relative internal resistances after the float tests (Relative internal resistance 2 and Relative internal resistance 3) were not good, necessitating a conclusion that these were evaluated as comparative examples of the present invention. In the comparative examples other than Manufacturing Examples 13 an 23, the relative internal resistance after the capacitor was let stand at low temperature (Relative internal resistance 1) was not good. All in all, the characteristic changes occurring after the capacitor was exposed to low-temperature environments, high-voltage environments, or high-temperature environments were small in all of the examples denoted by an asterisk (*) above.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2015-135316, filed Jul. 6, 2015, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An electric double-layer capacitor containing an electrolytic solution, wherein the electrolytic solution comprises 1.2 to 1.8 mol/L of spirobipyrrolidinium tetrafluoroborate as electrolyte as well as solvent, where the solvent contains 50 to 60 percent by volume of propylene carbonate, 30 to 36 percent by volume of dimethyl carbonate, and 4 to 20 percent by volume of ethyl methyl carbonate, wherein the electric double-layer capacitor has a first relative internal resistance of less than 500%, a second relative internal resistance of less than 200%, and a third internal resistance of less than 150%, wherein the first relative internal resistance is a ratio (%) of an internal resistance measured after the capacitor is let stand at −40° C., to an initial internal resistance of the capacitor; the second internal resistance is a ratio (%) of an internal resistance measured after a float test involving 1000 hours of continuous charging at a voltage of 2.7 V in a thermostatic chamber controlled at 70° C., to the initial internal resistance; and the third internal resistance is a ratio (%) of an internal resistance measured after a float test involving 1000 hours of continuous charging at a voltage of 2.3 V in a thermostatic chamber controlled at 85° C., to the initial internal resistance.

2. An electric double-layer capacitor according to claim 1, wherein a total weight of the spirobipyrrolidinium tetrafluoroborate, propylene carbonate, dimethyl carbonate, and ethyl methyl carbonate accounts for 95 percent or more of a total weight of the electrolytic solution.

3. An electric double-layer capacitor according to claim 2, wherein the electrolytic solution consists of the spirobipyrrolidinium tetrafluoroborate, propylene carbonate, dimethyl carbonate, and ethyl methyl carbonate.

4. An electric double-layer capacitor according to claim 1, wherein the electrolytic solution contains 1.5 to 1.8 mol/L of spirobipyrrolidinium tetrafluoroborate as electrolyte.

* * * * *